United States Patent
Schaller et al.

(10) Patent No.: US 10,285,378 B2
(45) Date of Patent: May 14, 2019

(54) MILKING CUP WITH ROTATING SHELL

(71) Applicant: Technologies Holdings Corp., Houston, TX (US)

(72) Inventors: Bradley A. Schaller, Monona, WI (US); Robert J. Godfrey, Monona, WI (US)

(73) Assignee: Technologies Holdings Corp., Houston, TX (US)

( * ) Notice: Subject to any disclaimer, the term of this patent is extended or adjusted under 35 U.S.C. 154(b) by 511 days.

(21) Appl. No.: 15/009,297

(22) Filed: Jan. 28, 2016

(65) Prior Publication Data

US 2017/0215370 A1    Aug. 3, 2017

(51) Int. Cl.
*A01J 5/02* (2006.01)
*A01J 5/08* (2006.01)

(52) U.S. Cl.
CPC .. *A01J 5/02* (2013.01); *A01J 5/08* (2013.01)

(58) Field of Classification Search
CPC ........ A01J 5/00; A01J 5/02; A01J 5/04; A01J 5/06; A01J 5/08; A01J 5/16; B65D 77/0486; B65D 77/0493
See application file for complete search history.

(56) References Cited

U.S. PATENT DOCUMENTS

| | | | |
|---|---|---|---|
| 2,073,737 A | 11/1935 | Ellison | |
| 3,818,867 A * | 6/1974 | Strange-Hansen | A01J 5/08 119/14.47 |
| 4,269,143 A | 5/1981 | Erbach | |
| 4,913,471 A | 4/1990 | Huneke | |
| 5,400,907 A * | 3/1995 | Chen | A47G 19/2227 206/459.1 |
| 5,712,004 A * | 1/1998 | Lin | B65D 25/20 428/33 |
| 5,884,421 A * | 3/1999 | Key | G09F 3/02 40/306 |
| 6,352,168 B1 * | 3/2002 | Lin | A47G 19/2227 220/23.88 |
| 6,564,962 B1 * | 5/2003 | Cheng | A47G 19/025 206/457 |

(Continued)

FOREIGN PATENT DOCUMENTS

| EP | 945056 A2 * | 3/1999 |
|---|---|---|
| GB | 337 849 A | 11/1930 |
| JP | 2013 066448 A | 4/2013 |

OTHER PUBLICATIONS

Notification of Transmittal of the International Search Report and the Written Opinion of the International Searching Authority or the Declaration, International Application No. PCT/US2017/015207, 13 pages, dated May 11, 2017.

*Primary Examiner* — Kristen C Hayes
(74) *Attorney, Agent, or Firm* — Baker Botts L.L.P.

(57) ABSTRACT

A milking cup comprising a body having a top portion and a bottom portion. The top portion has a first lip formed thereon and the bottom portion has a second lip formed thereon. The first lip and the second lip are separated by a distance. The milking cup further comprises a rotating shell positioned between and secured by the first lip and the second lip, wherein the rotating shell encircles the body and is operable to rotate around the body independently of the movement of the other portions of the body. The rotating shell has a length that corresponds to the distance between the first lip and the second lip.

16 Claims, 4 Drawing Sheets

(56) References Cited

U.S. PATENT DOCUMENTS

| | | |
|---|---|---|
| 7,290,470 B1 | 11/2007 | Peters |
| 8,302,561 B2 * | 11/2012 | Laney ................ A01J 5/08 |
| | | 119/14.47 |
| 2006/0040581 A1 * | 2/2006 | Davis ................ A47G 19/2227 |
| | | 446/71 |
| 2010/0314399 A1 | 12/2010 | George et al. |
| 2011/0036297 A1 * | 2/2011 | Laney ................ A01J 5/08 |
| | | 119/14.47 |
| 2012/0260777 A1 | 10/2012 | Baer, Jr. |
| 2014/0345531 A1 | 11/2014 | La Torre et al. |

* cited by examiner

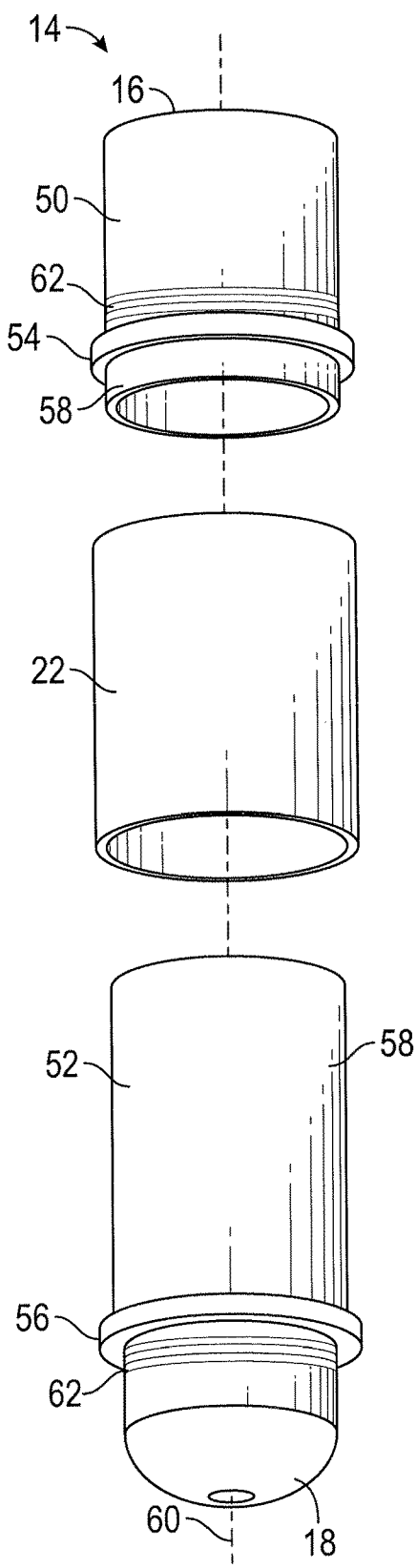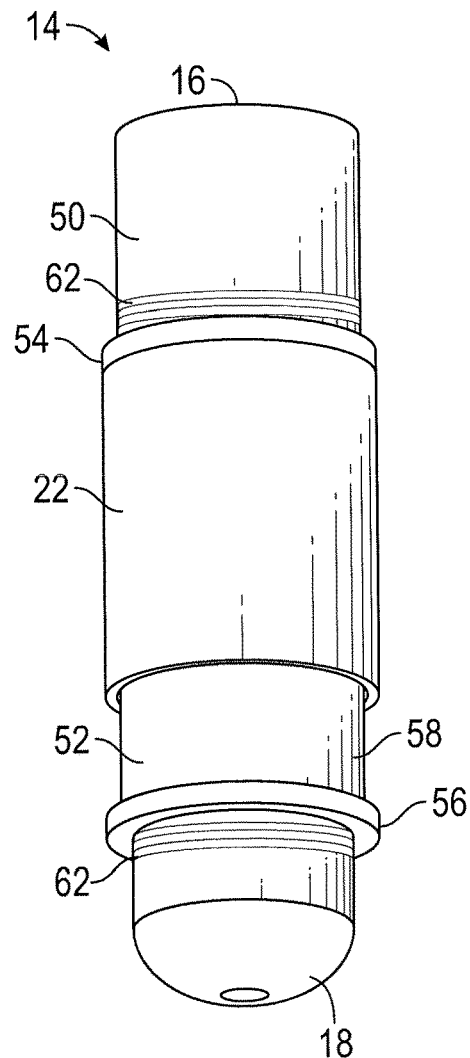
FIG. 2A
FIG. 2B

MILKING CUP WITH ROTATING SHELL

TECHNICAL FIELD OF THE INVENTION

The present invention relates generally to dairy equipment, and more specifically to a milking cup with rotating shell.

BACKGROUND

Dairy farms and parlors sometimes use milking cups to facilitate collecting milk from dairy animals, such as cows. However, these milking cups often cause hoses and other components of milking systems to twist when they are used for milking. This twisting can also irritate the dairy animal and cause the milking cup to fall off the cow. Thus, milking cups that can be used for milking while reducing twisting of hoses and other components coupled to the milking cup are needed.

SUMMARY

A milking cup comprising a body having a top portion and a bottom portion is disclosed. The top portion has a first lip formed thereon and the bottom portion has a second lip formed thereon. The first lip and the second lip are separated by a defined distance. The milking cup further comprises a rotating shell positioned between and secured by the first lip and the second lip. The rotating shell encircles the body and is operable to rotate around the body independently of the movement of the other portions of the body. The rotating shell also has a length that corresponds to the distance between the first lip and the second lip.

The present embodiment presents several distinct advantages. For example, when a rotational force is applied to a milking cup of the present embodiment, the milking cup rotates freely even if the milking cup is being held by a robotic arm or a human. In this manner, if the milking cup is coupled to hoses that are twisted, the milking cup can rotate to untwist the hoses without requiring the robotic arm or hand holding the milking cup to rotate as well. This embodiment keeps the milking cup from irritating or injuring a dairy animal by keeping the milking cup from rotating while the milking cup is coupled to a dairy animal. This embodiment further keeps the milking cup from twisting and falling off of a dairy animal.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which:

FIG. 2A illustrates an exploded view of one embodiment of milking cup;

FIG. 2B illustrates an assembled view of the milking cup of FIG. 2A;

DETAILED DESCRIPTION OF THE DRAWINGS

Dairy parlors and farms use milking systems to extract milk from dairy animals. These milking systems employ equipment, such as robotics and milking pipelines, to collect and transport milk from dairy animals to collection containers. For example, some modern dairy parlors and farms use milking cups and liners to extract milk from cows. These parlors and farms place liners inside the milking cups and then couple the liners to cow teats. The milking cups are sometimes coupled to pulsators or other devices that alternatively induce a vacuum and atmospheric pressure on the cup and the liner. This pulsation stimulates milking of the cow. Milk then flows out of the cow, through the cup, and into milking hoses that are coupled to pipelines or other conduits for transporting the milk to a container.

To automate this process and increase efficiency, dairy parlors sometimes employ robots to move the milking cups and attach the milking cups to dairy animals for milking. One way of using such robots is by having a robotic arm grab the milking cup and move the cup to the cow udder for coupling the milking cup to a teat. The robotic arms thus effectively reduce the time and work that would otherwise be done by a worker at the dairy or farm. However, the movement of these robotic arms can be coarse and, in some situations, the robotic arms can injure the cow or otherwise hinder the milking process. One such situation occurs when the robotic arms connect the milking cups to a cow teat and, in the process, rotate the milking cup while the cup is coupled to a milking hose and the cow teat. This rotation causes the teat and/or the milking hose to twist as well. Twisting the cow's teat can cause the cow discomfort and may even injure the cow. Twisting the milking hose can cause milk flow through the hose to become restricted and can even cause the milking cup to become disconnected from the cow teat.

To prevent such twisting of the cow teat and milking hose, the present embodiment contemplates a milking cup that has a rotating shell as its outer surface. The rotating shell is operable to slide and rotate across the body of the milking cup. A robotic arm can then grab the rotating shell of the cup and can rotate the shell as it attaches the cup to the teat without causing the teat and/or the milking hose to twist. This configuration thus enables a robotic arm to effectively function in a milking system and reduces the likelihood of injury to the cow by the twisting of the milking cup.

Figure 1:
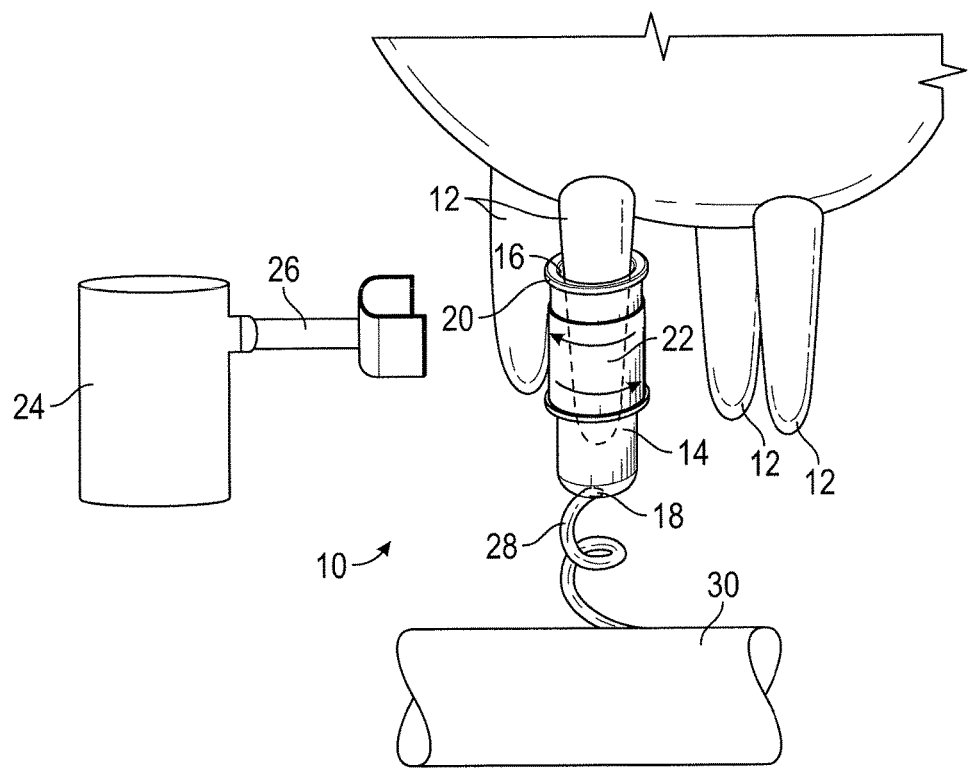
FIG. 1 illustrates a milking system using one embodiment of the disclosed milking cup.
Figure 3:
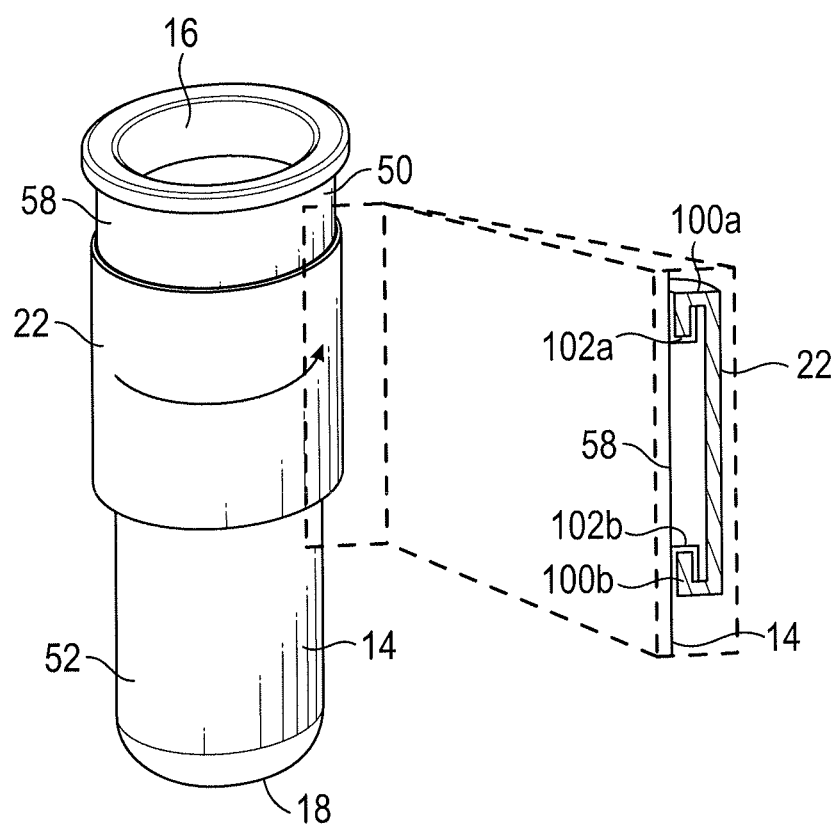
FIG. 3 illustrates a perspective and blown-up view of one embodiment of the disclosed milking cup with a rotating shell.
Figure 4:
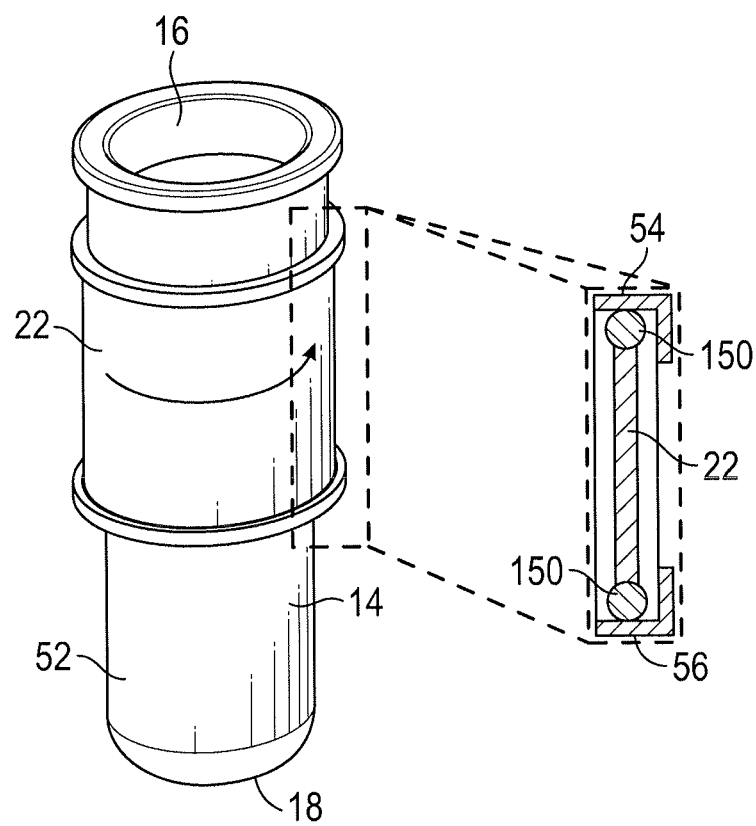
FIG. 4 illustrates a perspective and blown-up view of another embodiment of the disclosed milking cup with a rotating shell.

The present disclosure will be described in more detail using FIGS. 1 through 4. FIG. 1 illustrates a milking system using one embodiment of the disclosed milking cup. FIG. 2A illustrates an exploded view of one embodiment of milking cup. FIG. 2B illustrates an assembled view of the milking cup of FIG. 2A. FIG. 3 illustrates a perspective and blown-up view of one embodiment of the disclosed milking cup with a rotating shell. And FIG. 4 illustrates a perspective and blown-up view of another embodiment of the disclosed milking cup with a rotating shell.

FIG. 1 illustrates a system 10 with a milking cup 14 coupled to a liner 20. Milking cup 14 has a first opening 16 and a second opening 18. The outer surface of milking cup 14 forms a rotating shell 22. System 10 further comprises a robot 24 having a robotic arm 26. As shown, liner 20 is positioned inside milking cup 14. During operation, as illustrated, liner 20 is attached to a dairy animal teat 12 and milk flows from teat 12 through liner 20, which is positioned inside milking cup 14, and into pipeline 30 via milking hose 28.

As shown, teat 12 suspends from an udder of a dairy animal and may be positioned inside liner 20 which is positioned inside milking cup 14. Although this disclosure contemplates that the dairy animal is a cow, in other embodiments, the dairy animal may be any other suitable animal including goats, sheep, buffalo etc.

Milking cup 14 may be any container, vessel, tube or conduit through which fluids can flow. In various embodiments, milking cup 14 may be made of various different materials including metals and flexible or rigid polymers. Milking cup 14 may be of any suitable size large enough to fit teat 12 and liner 20. In some embodiments, milking cup 14 has a rotating shell 22 as its outer surface. Rotating shell 22 may be operable to move or rotate across the body of milking cup 14. For example, in some embodiments, rotating shell 22 may be slidably coupled to the body of milking cup 14 so that rotating shell 22 is operable to slide across the body of milking cup 14. Three such embodiments of milking cup 14 are described in greater detail with respect to FIG. 2 through FIG. 4 below. Milking cup 14 has a first opening 16 and a second opening 18.

First opening 16 of milking cup 14 is positioned at one end of milking cup 14 and second opening 18 is positioned at a second end of milking cup 14. First opening 16 and second opening 18 may be of any suitable shape including a circular shape. First opening 16 is sized so that at least a portion of teat 12 may be inserted into milking cup 14 via first opening 16. Second opening 18 is sized so that fluid inside liner 20, which is positioned inside milking cup 14, may flow out of milking cup 14.

Liner 20 is a flexible tube or conduit that may be positioned inside milking cup 14. Liner 20 may be made of any suitable material including any flexible polymer or rubber. In some embodiments, liner 20 may be molded to approximate the shape of teat 12. Liner 20 is operable to relax and constrict as the air pressure between liner 20 and milking cup 14 increases and decreases. As such, in embodiments where liner 20 is coupled to a pulsator (not shown) operable to pressurize and depressurize milking cup 14, liner 20 relaxes and constricts as the pulsator pressurizes and depressurizes milking cup 14. In such embodiments, the pressurization and depressurization of liner 20 induces milking in the dairy animal.

As illustrated, one end of liner 20 is coupled to milking hose 28 and a second end of liner 20 is coupled to milking cup 14. Milking hose 28 may be any tube or conduit through which fluids can flow. In various embodiments, milking hose 28 may be made of various different materials including rubber and flexible or rigid polymers. Milking hose 28 may have a first end and a second end. As shown, the first end of milking hose 28 is coupled to liner 20. The second end of milking hose 28 is coupled to a pipeline 30. In some embodiments, milking hose 28 may not be directly coupled to liner 20 or pipeline 30. Instead, milking hose 28 may additionally be coupled to other components such as valves, milk meters, other conduits, couplers, etc.

In some embodiments, system 10 further comprises a robot 24 having a robotic arm 26. Robot 24 may be any machine or device operable to control and navigate robotic arm 26. Robot 24 may use any combination of hardware or software to operate robotic arm 26. Robot 24 may employ processors, memory, interfaces, or any other hardware and electronics to control and navigate robotic arm 26. Some embodiments of robot 24 may control multiple robotic arms 26.

Robotic arm 26 may be any mechanical or electromechanical device operable to grab, rotate, twist, move, and otherwise interact with milking cup 14. Robotic arm 26 may comprise any suitable hardware or software including any electronics for receiving instructions from robot 24. Robotic arm 26 may be made of any suitable material including metal, polymer, rubber, a combination of such materials, etc. In some embodiments, robotic arm 26 is operable to grip milking cup 14 and attach milking cup 14 to a teat 12 for milking as described in greater detail below.

Although system 10 is illustrated as having a robot 26 with robotic arm 26, in other embodiments, system 10 may not comprise any of these features. In such embodiments, a user may manually move and install milking cup 14 to a teat 12 for milking. Alternatively, some embodiments of system 10 may utilize other mechanical or electromechanical devices such as a manual claw to move and attach milking cup 14 to teat 12.

In operation, robotic arm 26 grips milking cup 14 to position milking cup 14 under teat 12. In this embodiment, one end of liner 20, which is positioned inside and coupled to milking cup 14, is further coupled to milking hose 28. Milking hose 28 is also coupled to pipeline 30. Robotic arm 26 moves milking cup 14 to teat 12 and attaches milking cup 14 to teat 12 by positioning milking cup 14 under teat 12 and inserting teat 12 into milking cup 14. In some embodiments, milking hose 28 may twist when robotic arm 26 couples with milking cup 14 and moves milking cup 14 under teat 12. If robotic arm 26 attaches milking cup 14 to teat 12 while milking hose 28 is twisted, milking hose 28 will apply a rotational force upon teat 12 as it attempts to untwist after it is coupled to teat 12. This rotational force may cause discomfort to the dairy animal and it may cause milking cup 14 to fall off of teat 12.

In an embodiment contemplated by the present disclosure, however, robotic arm 26 grips the rotating shell 22 of milking cup 14 as robotic arm 26 moves milking cup 14 under teat 12. In such embodiments, if milking hose 28 twists when robotic arm 26 grips milking cup 14, rotating shell 22 rotates independently of milking cup 14 and causes milking hose 28 to untwist before milking cup 14 is coupled to teat 12. In this manner, little to no rotational force is applied to teat 12 and milking cup 14 securely couples with teat 12 while reducing or eliminating discomfort to the dairy animal.

FIG. 2A illustrates an exploded view of one embodiment of milking cup 14. In this embodiment, milking cup 14 is separated into a top portion 50 and a bottom portion 52. Top portion 50 has a top lip 54 and bottom portion 52 has a bottom lip 56. As illustrated, rotating shell 22 is positioned in between top portion 50 and bottom portion 52. FIG. 2B illustrates an assembled view of the milking cup 14 of FIG. 2A where top portion 50 is connected to bottom portion 52. In this embodiment, rotating shell 22 is positioned in between top portion 50 and bottom portion 52 and is secured by top lip 54 and bottom lip 56.

In this embodiment, milking cup 14 has a body 58 comprised of top portion 50 and bottom portion 52. Top portion 50 may be connected to bottom portion 52 in any suitable manner. For example, top portion 50 may be welded, screwed, glued, etc. to bottom portion 52. Although the illustrated embodiment shows milking cup 14 with a top portion 50 and a bottom portion 52 that are connected together, in other embodiments, milking cup 14 may be made of any number of portions including one continuous portion.

In one embodiment, rotating shell 22 has an inner dimension, such as an inner diameter, that is larger than a corresponding outer dimension, such as an outer diameter, of body 58. As shown, rotating shell 22 encircles body 58 and is positioned in between top lip 54 and bottom lip 56. Top lip 54 and bottom lip 56 may be any protrusions, notches, or other suitable formations on top portion 50 and bottom portion 52 for preventing rotating shell 22 from sliding off of body 58. In some embodiments, rotating shell 22 may have a length that is shorter than the distance between top lip 54 and bottom lip 56. In this embodiment, rotating shell 22 may be operable to slide laterally between top lip 54 and bottom lip 56 in addition to rotating around body 58. In some embodiments, top lip 54 and bottom lip 56 may be removably coupled to milking cup 14. For example, in embodiments where milking cup 14 is formed of one continuous portion, milking cup 14 may have a threaded portion 62 and top lip 54 and/or bottom lip 56 may be removably screwed onto milking cup 14 via the threaded portion 62.

As illustrated, milking cup 14 is positioned along a longitudinal axis 60 and body 58 extends along the length of longitudinal axis 60. In the illustrated embodiment, rotating shell 22 rotates across the body of milking cup 14 around longitudinal axis 60. Although the illustrated embodiment shows rotating shell 22 as forming a center portion of milking cup 14, in other embodiments, top portion 50, bottom portion 52, or any other suitable portion of milking cup 14 may comprise rotating shell 22. For example, in one embodiment, top portion 50 of milking cup 14 may rotate independently of the remaining portions of milking cup 14. In such an embodiment, if milking hose 28 is twisted, liner 20 may exert a rotational force upon the top portion 50 of milking cup 14 to rotate top portion 50 independently of the other portions of milking cup 14 and untwist milking hose 28. In various embodiments, rotating shell 22 may be made of various different materials including a material that is different from or the same as the rest of milking cup 14. In some embodiments, rotating shell 22 may be metallic and/or magnetic. Rotating shell 22 may be coated with a corrosion or wear resistant plating such as a nickel plating. In some embodiments, the plating of rotating shell 22 may facilitate the rotation of rotating shell 22 across top portion 50 and bottom portion 52 by reducing the friction between rotating shell 22 and top/bottom portions 50 and 52.

In embodiments where rotating shell 22 is made of a magnetic material, robotic arm 26 may magnetically grab rotating shell 22. Rotating shell 22 may be operable to rotate in either a clockwise or counterclockwise direction independently of the movement of the remaining portions of milking cup 14 including top portion 50 and bottom portion 52 of milking cup 14. In some embodiments, rotating shell 22 may rotate in both a clockwise and a counterclockwise direction. In other embodiments, rotating shell 22 may rotate in only one of a clockwise direction or a counterclockwise direction. Further, in some embodiments, rotating shell 22 may be operable to rotate freely or lock into place.

FIG. 3 illustrates another embodiment of milking cup 14 with rotating shell 22 including a cross-sectional cut-out of milking cup 14. In the illustrated cut-out, rotating shell 22 has two hooks 100a and 100b that engage with two guide tracks 102a and 102b respectively. Guide tracks 102a and 102b are formed upon top portion 50 and bottom portion 52 of milking cup 14. In one embodiment, guide tracks 102a and 102b are shaped so that hooks 100a and 100b latch onto guide tracks 102a and 102b.

In the illustrated embodiment, hook 100a is formed along a top portion of rotating shell 22 and encircles rotating shell 22. In this manner, hook 100a engages with guide track 102a along the length of rotating shell 22. Similarly, hook 100b is formed upon a bottom portion of rotating shell 22 and also encircles rotating shell 22. Hook 100b engages with guide track 102b along the length of rotating shell 22. In this manner, rotating shell 22 securely fastens onto body 58. When hooks 100a and 100b are latched onto guide tracks 102a and 102b, rotating shell 22 can slide on guide tracks 102a and 102b independently of body 58.

FIG. 4 illustrates another embodiment of milking cup 14 with a rotating shell 22. FIG. 4 also illustrates a blown-up view of a cross-sectional cut-out of milking cup 14 showing rotating shell 22 positioned between top lip 54 and bottom lip 56 and where rotating shell is coupled to rollers 150.

Rollers 150 may be any round or spherical object that reduces the friction between rotating shell 22 and body 58. Rollers 150 may be coupled to the edges of rotating shell 22 or may be positioned at any other suitable position to facilitate sliding rotating shell 22 across body 58. For example, in some embodiments, rollers 150 may be positioned in between rotating shell 22 and body 58 near the middle of rotating shell 22.

Although FIGS. 2 through 4 illustrate several embodiments of how rotating shell 22 may rotate across body 58, in other embodiments, rotating shell 22 may rotate across body 58 in various different ways using any suitable mechanism whereby rotating shell 22 moves across body 58 independently of the movement of other portions of milking cup 14.

Modifications, additions, or omissions may be made to the systems, apparatuses, and processes described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A milking cup comprising:
   a body having a top portion and a bottom portion, wherein the top portion has a first lip formed thereon and the bottom portion has a second lip formed thereon, and wherein the first lip and the second lip are separated by a distance; and
   a rotating shell positioned between the first lip and the second lip, wherein the rotating shell is magnetic and secured onto the body by the first lip and the second lip, the rotating shell encircles the body and is operable to rotate around the body independently of the movement of the other portions of the body, and wherein the rotating shell has a length that corresponds to the distance between the first lip and the second lip.

2. The milking cup of claim 1, wherein:
the rotating shell has a first hook formed upon a first portion of the shell and a second hook formed upon a second portion of the shell;
wherein the first hook engages with the first lip and the second hook engages with the second lip to fasten the outer shell onto the milking cup body; and
the rotating shell is operable to rotate around the body by sliding on the lips.

3. The milking cup of claim 1, wherein a plurality of rollers are coupled to the shell and are operable to roll between the shell and the body for rotating the shell around the body.

4. The milking cup of claim 1, wherein a portion of the body is threaded and the first lip is removably coupled to the top portion by screwing the lip onto the body via the threaded portion.

5. The milking cup of claim 1, wherein the rotating shell is configured to be gripped by a robotic arm.

6. The milking system of claim 1, wherein the rotating shell is coated with a corrosion resistant plating.

7. A milking system comprising:
a milking cup having a first opening and a second opening, the milking cup comprising:
  a body having a top portion and a bottom portion, wherein the top portion has a first lip formed thereon and the bottom portion has a second lip formed thereon, and wherein the first lip and the second lip are separated by a distance; and
  a rotating shell positioned between the first lip and the second lip, wherein the rotating shell is magnetic and secured onto the body by the first lip and the second lip and the rotating shell encircles the body and is operable to rotate around the body independently of the movement of the other portions of the body, and wherein the rotating shell has a length that corresponds to the distance between the first lip and the second lip; and
a liner coupled to the milking cup, wherein the liner is operable to couple with a milking hose and direct fluid from the first opening of the milking cup to the second opening of the milking cup.

8. The milking system of claim 7, wherein:
the rotating shell has a first hook formed upon a first portion of the shell and a second hook formed upon a second portion of the shell;
wherein the first hook engages with the first lip and the second hook engages with the second lip to fasten the outer shell onto the milking cup body; and
the rotating shell is operable to rotate around the body by sliding on the lips.

9. The milking system of claim 7, wherein a plurality of rollers are coupled to the shell of the milking cup and the rollers are operable to roll between the shell and the body for rotating the shell around the body.

10. The milking system of claim 7, wherein a portion of the milking cup body is threaded and the first lip is removably coupled to the top portion of the milking cup by screwing the lip onto the milking cup body via the threaded portion.

11. The milking system of claim 7, wherein a robotic arm is operable to magnetically grip the rotating shell of the milking cup for moving and rotating the cup.

12. The milking system of claim 7, wherein the rotating shell of the milking cup is coated with a corrosion resistant plating.

13. A milking cup comprising:
a body having a top portion and a bottom portion, wherein the top portion has a first lip formed thereon and the bottom portion has a second lip formed thereon, and wherein the first lip and the second lip are separated by a distance; and
a rotating shell positioned between the first lip and the second lip, wherein the rotating shell is secured onto the body by the first lip and the second lip, the rotating shell encircles the body and is operable to rotate around the body independently of the movement of the other portions of the body, and wherein the rotating shell has a length that corresponds to the distance between the first lip and the second lip;
wherein a portion of the body is threaded and the first lip is removably coupled to the top portion by screwing the lip onto the body via the threaded portion.

14. A milking system comprising:
a milking cup having a first opening and a second opening, the milking cup comprising:
  a body having a top portion and a bottom portion, wherein the top portion has a first lip formed thereon and the bottom portion has a second lip formed thereon, and wherein the first lip and the second lip are separated by a distance; and
  a rotating shell positioned between the first lip and the second lip, wherein the rotating shell is secured onto the body by the first lip and the second lip and the rotating shell encircles the body and is operable to rotate around the body independently of the movement of the other portions of the body, and wherein the rotating shell has a length that corresponds to the distance between the first lip and the second lip;
  wherein a portion of the milking cup body is threaded and the first lip is removably coupled to the top portion of the milking cup by screwing the lip onto the milking cup body via the threaded portion; and
a liner coupled to the milking cup, wherein the liner is operable to couple with a milking hose and direct fluid from the first opening of the milking cup to the second opening of the milking cup.

15. A milking system comprising:
a milking cup having a first opening and a second opening, the milking cup comprising:
  a body having a top portion and a bottom portion, wherein the top portion has a first lip formed thereon and the bottom portion has a second lip formed thereon, and wherein the first lip and the second lip are separated by a distance; and
  a rotating shell positioned between the first lip and the second lip, wherein the rotating shell is secured onto the body by the first lip and the second lip and the rotating shell encircles the body and is operable to rotate around the body independently of the movement of the other portions of the body, and wherein the rotating shell has a length that corresponds to the distance between the first lip and the second lip;
  wherein:
    the rotating shell has a first hook formed upon a first portion of the shell and a second hook formed upon a second portion of the shell;

wherein the first hook engages with the first lip and the second hook engages with the second lip to fasten the outer shell onto the milking cup body; and the rotating shell is operable to rotate around the body by sliding on the lips; and a liner coupled to the milking cup, wherein the liner is operable to couple with a milking hose and direct fluid from the first opening of the milking cup to the second opening of the milking cup.

16. A milking system comprising:

a milking cup having a first opening and a second opening, the milking cup comprising:

a body having a top portion and a bottom portion, wherein the top portion has a first lip formed thereon and the bottom portion has a second lip formed thereon, and wherein the first lip and the second lip are separated by a distance; and a rotating shell positioned between the first lip and the second lip, wherein the rotating shell is secured onto the body by the first lip and the second lip and the rotating shell encircles the body and is operable to rotate around the body independently of the movement of the other portions of the body, and wherein the rotating shell has a length that corresponds to the distance between the first lip and the second lip;

wherein a plurality of rollers are coupled to the shell of the milking cup and the rollers are operable to roll between the shell and the body for rotating the shell around the body; and a liner coupled to the milking cup, wherein the liner is operable to couple with a milking hose and direct fluid from the first opening of the milking cup to the second opening of the milking cup.

* * * * *